United States Patent [19]
Adams et al.

[11] 4,401,016
[45] Aug. 30, 1983

[54] AERATED DRINKS MACHINE

[75] Inventors: Francis J. Adams, Poling; Robert P. Child, Cosham; Barry G. Charles, Rowlands Castle, all of England

[73] Assignee: Thorn Emi Domestic Electrical Appliances Limited, London, England

[21] Appl. No.: 351,170

[22] Filed: Feb. 22, 1982

[30] Foreign Application Priority Data

Feb. 24, 1981 [GB] United Kingdom ................ 8105758

[51] Int. Cl.³ .......................... B01F 3/04; A23L 2/40

[52] U.S. Cl. .............................. 99/323.1; 261/121 R; 261/DIG. 7; 222/397

[58] Field of Search .................... 99/275, 323.1, 323.2; 261/121 R, 122-124, DIG. 7, DIG. 65; 222/325, 396, 397, 399

[56] References Cited

U.S. PATENT DOCUMENTS 3,953,550 4/1976 Gilbey ......................... 261/DIG. 7
4,298,551 11/1981 Adolfsson ......................... 99/323.1
4,304,741 12/1981 Conway ............................. 99/323.1

*Primary Examiner*—Robert W. Jenkins
*Attorney, Agent, or Firm*—Fleit, Jacobson & Cohn

[57] ABSTRACT

An appliance for making an aerated beverage by introducing carbon dioxide under pressure into a bottle (29) partly filled with water, in which a support member (16) is pivotally mounted by a pivot (15) on the casing (10) and carries the shatterproof housing, (24), which surrounds the bottle, the nozzle (31), the stopper (27) and the container (18) of pressurized liquid carbon dioxide, so that these all pivot with the support member as a pivotal assembly. Such a construction can be made relatively inexpensively.

10 Claims, 2 Drawing Figures

AERATED DRINKS MACHINE

DESCRIPTION

Figure 1:
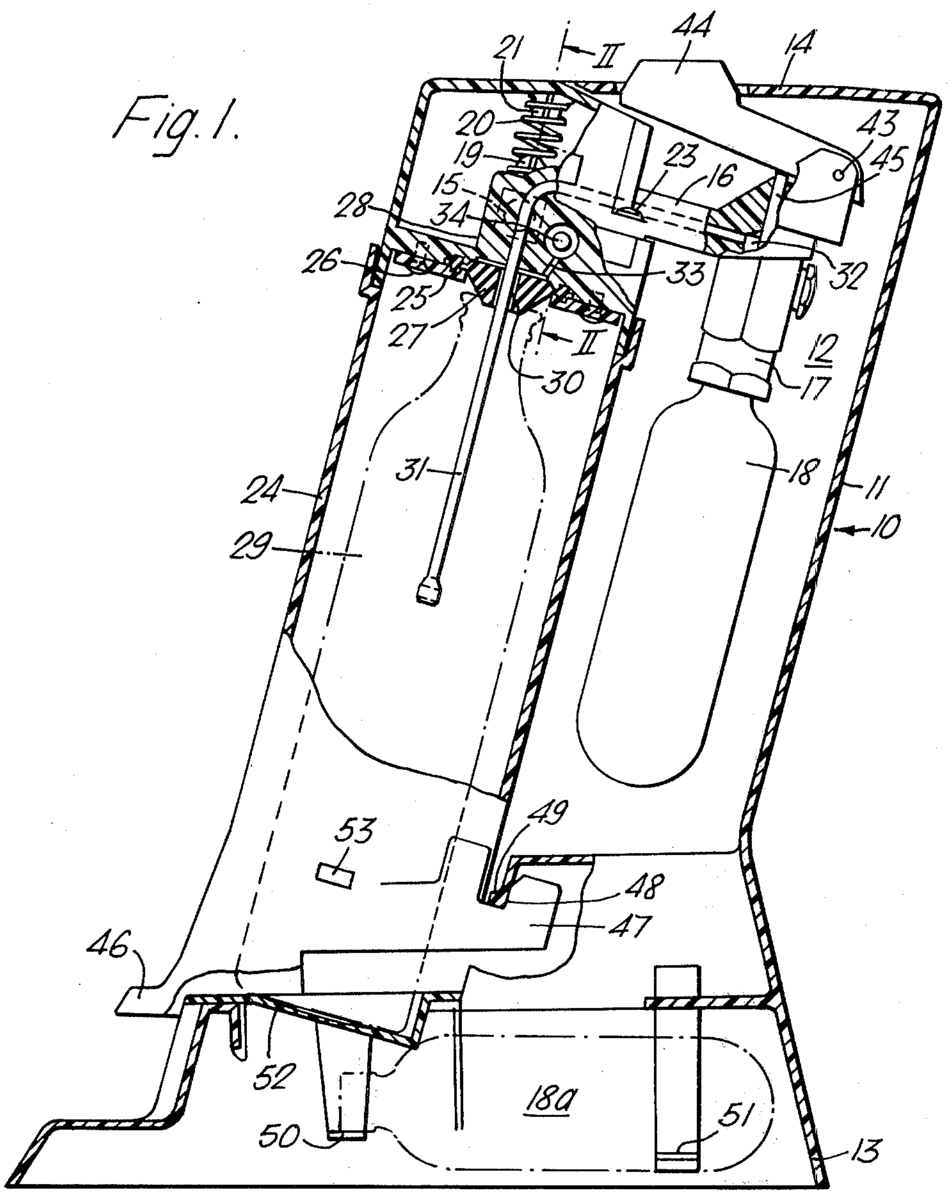

The present invention relates to an appliance for making an aerated beverage.

Conventionally, an appliance of this type can consist of a casing, in which is enclosed or mounted a container of pressurized liquid carbon dioxide. Connected to this container, by a manually operated valve, is an elongate nozzle which is either permanently angled downwardly and forwardly or is pivotable between such a position and a vertical position. A bottle, which is partly filled with water, is moved upwardly relative to the nozzle, so that the nozzle is immersed in the water, with the nozzle in the inclined position. The bottle is held in place with its neck against a stopper at the top of the nozzle, usually after pivoting the nozzle to the vertical position. The appliance usually also includes a shatterproof housing which surrounds the bottle, when it is in position around the nozzle.

A manually operated valve is actuated a few times and carbon dioxide gas is thus introduced into the water. The safety valve is provided which releases any excess pressure which may occur in the bottle which may thereafter be removed from the appliance and its contents are either used in this form, as soda water, or a concentrate flavouring syrup is added to obtain an aerated beverage, such as lemonade, tonic water, or cola etc.

Such a construction is relatively complex and expensive to manufacture.

It is now proposed, according to the present invention, to provide an appliance for making an aerated beverage, said appliance comprising a casing, a support member pivotally mounted on said casing, a connection carried by said support member for mounting a container of pressurized liquid carbon dioxide, a shatterproof housing for a bottle of water carried by said support member, a nozzle communicating with said connection and extending from said support member downwardly within said housing, a stopper for engaging in the neck of a bottle, means for supporting the bottle in said housing so that the stopper is engaged therein, and a safety pressure valve connected to the interior of the bottle when the stopper is engaged in its neck, the pivotable connection between the casing and the support member causing the shatterproof housing, the nozzle, the stopper and the container of pressurized liquid carbon dioxide all to pivot therewith relative to the casing, as a pivotal assembly, from a first position in which the bottle can be introduced into or removed from the housing and a second position in which the means for supporting the bottle engage the bottle to prevent its removal.

Such a construction can be made significantly less expensively since it can consist of fewer components.

Preferably, a duct is provided within the support member to permit the carbon dioxide to flow from the container to the nozzle. This has a number of advantages. Firstly, it dispenses with the necessity for any flexible hoses which have hitherto been necessary, because the housing has had to pivot relative to the container, and this means that the construction is far simpler requiring less component parts, including fittings for the flexible hose, and less assembly time. Secondly, it prevents any possibility of there being any leak path between the container of pressurized carbon dioxide and the nozzle.

Conventionally the containers of pressurized carbon dioxide have had a built-in valve. This arrangement could again be used in which the valve on the container is mounted into the connection. Preferably, however, the valve forms part of the connection and can be moulded into the connection. Such an arrangement could be used with a disposable carbon dioxide container which does not have its own valve, but merely a piercable closure which can be pierced by an element associated with the valve as the disposable container is screwed into place. Such disposable containers are usually rather smaller than the returnable containers having a built-in valve.

The construction of the present invention, it will be appreciated, greatly facilitates the mounting of the container whether it be the disposable or returnable type. The pivotal assembly is simply pivoted forward and one can readily unscrew the container and screw in a fresh one without the necessity for tipping the whole appliance upside down, as has previously been necessary, and removing a back cover.

Indeed the construction of the present invention can have a far simpler casing. In a preferred construction, the casing is moulded in one piece as a generally channel shaped moulding, with the web of the channel at the rear and the open sides at the front, the pivotal assembly being pivoted thereto adjacent the top and two side members of the channel. This requires a far smaller number of mouldings than has hitherto been necessary and this again reduces the cost of the appliance.

The valve may be operable by a manually actuable member. Preferably, the pivoting of the support member to the first position prevents the manually actuable member from being actuated, this providing a safety feature.

In a particular construction of appliance according to the invention, the safety pressure valve is mounted on said support member adjacent the stopper and is connected to the space above the water in the bottle only by a simple bore through said support member. A releasable latch may be provided to lock the pivotal assembly in the said position. Desirably, actuation of said latch to its release position is arranged to cause unseating of the safety pressure valve thus to release pressure in the space above the water in the bottle before the pivotal assembly can be moved to its first position.

Advantageously the stopper is mounted on a flexible diaphragm or bellows having a space thereabove connected to the safety pressure valve and to the interior of the bottle, the upwardly projected area of the diaphragm forming a wall of said space having an area greater than the downwardly projected area of the stopper, whereby the diaphragm is forced by gas pressure within the bottle acting on the differential areas to urge the stopper into the neck of the bottle. Such a construction is very advantageous with the pivotal assembly of the present invention, because it enables a far fewer number of steps to be carried out by the user as has hitherto been the case, because it has previously been necessary to urge the bottle upwardly by means of operating a lever. This need no longer be done. The casing is preferably provided with a ledge which serves to hold the bottle in a position when the pivotal assembly is in its second position.

Figure 2:
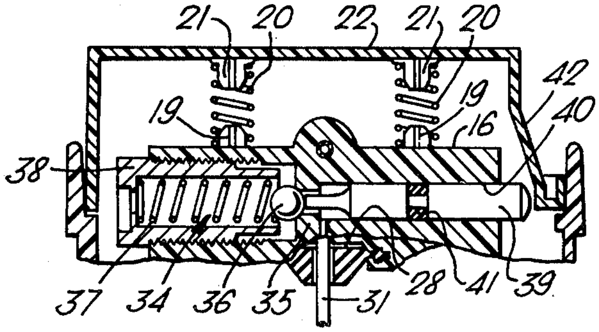

In order that the present invention may more readily be understood, the following description is given, merely by way of example, reference being made to the accompanying drawings in which:

FIG. 1 is a cross-section through one embodiment of appliance according to the invention; and FIG. 2 is an enlarged cross-section taken along the line II—II of FIG. 1.

Referring first to FIG. 1, the appliance illustrated therein comprises a casing indicated by the general reference numeral 10, this being formed as a one piece moulding of generally channel cross-section to provide a rear wall 11, two side walls 12, a base 13, and a top wall 14.

A pivot 15 is provided between the two side walls adjacent the front and near the top thereof. This serves to mount pivotally a one-piece moulded support member 16 which supports a number of further components. Firstly, it has threaded into it a valve 17 to the lower end of which is threaded a container 18 of pressurised liquified carbon dioxide. This container 18 includes a diaphragm (not shown) which normally seals the upper end of the container and the valve 17 includes a knife (not shown) which pierces the diaphragm when the container 18 is screwed into the lower end of the valve 17.

At its forward end, the support member 16 is provided, on its upper surface, with two upstanding cruciform section bosses 19 over each of which is engaged the lower end of a separate compression spring 20, and similar cruciform projections 21 on a cap member 22 engage the upper end of the spring to urge the cap member upwardly. Screws, only one of which is shown at 23 hold the cap member 22 in engagement with the upper end of a generally cylindrical shatter-proof housing 24 formed of translucent plastics material, for example ABS.

A plate member 25 urges a diaphragm 26 upwardly against the lower surface of the support member 16, the diaphragm 26 carrying a stopper 27 in such a way as to leave a space 28 thereabove, the upwardly projecting area of the diaphragm forming a wall of the space 28, this area being greater than the downwardly projected area of the stopper, when the latter is engaged in the neck of a bottle which is indicated in phantom at 29 within the shatter-proof housing 24.

Passing through an opening 30 in the stopper is an elongate nozzle 31 which is moulded into the support member and communicates with a bore 32 of the screw threaded valve 17.

The space 28 above the diaphragm 25 communicates with a passage 33 which in turn communicates with a safety pressure relief valve assembly 34 which is illustrated in greater detail in FIG. 2. The safety pressure relief valve 34 comprises a valve seat 35 against which is urged a ball 36 by means of a spring 37, the loading of which can be adjusted to give a particular relief pressure by rotating the externally threaded valve spring sleeve 38.

A pin 39 is axially reciprocable in a bore 40 which is aligned with the valve seat, the pin being provided with an O-ring seal 41. The right-hand end of the pin extends out from the moulding 16 and is located adjacent a cam surface 42 formed on the cap 22. Thus when the housing 24 and the cap 22 are pressed downwardly against the action of the spring 20, the cam surface 42 engages the pin 39 to unseat the valve ball 36.

Rockably mounted on the support member 16, by a pivot 43 is an actuating lever 44, downward movement of which, in an anti-clockwise direction about the axis 43, causes the lever to depress an actuating pin 45 which actuates the valve 17.

At its lower end the housing 24 is provided with a forwardly extending holding lip 46 while at its rear end there are two rearwardly extending latch members 47 only one of which can be seen in the drawings. These latch members include a recessed portion 48 which is engagable under a downwardly extending projection 49 formed on the casing 10.

Mounted in the lower part of the base on clips 50, 51 is a spare container 18A of pressurised liquid carbon dioxide.

It will be appreciated that when the support member 16 is pivoted in a clockwise direction about the axis 15, shatterproof housing 24, the nozzle 31, the stopper 27 and the container 18 of pressurised liquid carbon dioxide all pivot relative to the casing, as a pivotal assembly. The assembly is normally kept in the position illustrated in the drawing by means of the latch 47,48,49.

In order to use the above-described appliance, one fills the bottle 29 about three quarters full of water, and then releases the latch by pressing down on the lip 46 to disengage the recess 48 from the projection 49, this movement being accommodated by the springs 20. It is then possible to insert the bottle into the housing with the neck of the bottle surrounding the nozzle 31 and so that it lightly engages against the stopper.

The pivotal assembly is then pivoted back to the position shown and the housing pushed down again by means of the lip 46 so that the latch is once again engaged to hold the whole assembly in the position illustrated. As soon as one presses the lever 44, carbon dioxide is released by the valve 17 and passes along the passage within the nozzle 31, so that the carbon dioxide is introduced into the water. Some of the carbon dioxide will rise to the surface and will pass up through the aperture 30 enabling it to act on the upper surface of the diaphragm forming the lower wall of the space 28. Since this has a greater area than the stopper, the pressure will urge the stopper downwardly to engage it in the neck of the bottle. Continued actuation of the lever 44 will allow more carbon dioxide to pass into the water until the pressure above the water reaches a pre-set value of the valve 34, the pressure passing via duct 33. When the pressure reaches the pre-set value, the valve 34 will open and this will normally make a noise so that the user knows that the pressure has reached the desired value.

In order to take the bottle out again, one grasps the lip 46 and presses downwardly against the action of the springs 20. The cam surface 42 will force the pin 39 in inwardly and this will unseat the valve ball 36 thereby releasing excess pressure of the water in the bottle to atmosphere. As soon as this has happened, one can pivot the pivotal assembly as before and thus remove the bottle 29 either to use it as soda water, or to add a flavouring to make some other drink.

It will be appreciated that every time one presses down on the lip 46, the cam surface 42 will urge the pin 39 to unseat the valve. This means that during every operation described above, the valve will be unseated and re-seated twice, at least, thus ensuring that the valve does not stick.

It will be noted that the lower surface of the platform 52 which supports the bottom of the bottle is slightly dished to accommodate the pivotal movement of the bottle relative to the platform. Furthermore an aperture 53 is provided and this may be used to locate a ring (not shown) which centres the bottle within the housing 24.

From time to time, the gas in the cylinder 18 will become exhausted and it will be necessary to insert a new container. One simply does this by pivoting the housing as indicated above, to a slightly greater extent, and simply unscrewing the container and replacing it with a new container, the diaphragm of which will be pierced with a knife in the valve. That is all that it is necessary to do. During this pivoting action the lever 44 will disappear under the top wall of the housing adjacent the reference numeral 14 thus preventing the lever 44 from being accidentally actuated.

We claim:

1. An appliance for making an aerated beverage, said appliance comprising a casing, a support member pivotally mounted on said casing, a connection carried by said support member for mounting a container of pressurized liquid carbon dioxide, a shatterproof housing for a bottle of water carried by said support member, a nozzle communicating with said connection and extending from said support member downwardly within said housing, a stopper for engaging in the neck of a bottle, means for supporting the bottle in said housing so that the stopper in engaged therein, and a safety pressure valve connected to the interior of the bottle when the stopper is engaged in its neck, the pivotable connection between the casing and the support member causing the shatterproof housing, the nozzle, the stopper and the container of pressurized liquid carbon dioxide all to pivot therewith relative to the casing, as a pivotal assembly, from a first position in which the bottle can be introduced into or removed from the housing and a second position in which the means for supporting the bottle engage the bottle to prevent its removal.

2. An appliance as claimed in claim 1, and further comprising a duct within said support member to permit carbon dioxide to flow from said container to said nozzle.

3. An appliance as claimed in claim 1, and further comprising a valve forming part of said connection, or mountable on said connection, said valve being operable effective to allow carbon dioxide to flow to said nozzle.

4. An appliance as claimed in claim 3, and further comprising a manually actuable member to operate said valve.

5. An appliance as claimed in claim 4, wherein pivoting of said support member to its first position prevents said manually actuable member from being actuated.

6. An appliance as claimed in claim 1, wherein the safety pressure valve is mounted on said support member adjacent the stopper and is connected to the space above the water in the bottle only by a simple bore through said support member.

7. An appliance as claimed in claim 6, and further comprising a releasable latch to lock the pivotal assembly in said second position.

8. An appliance as claimed in claim 7, wherein actuation of said latch to its release position is arranged to cause unseating of the safety pressure valve, thus to release pressure in the space above the water in the bottle before the pivotal assembly can be moved to its first position.

9. An appliance as claimed in claim 1, and further comprising a flexible diaphragm or bellows having a space thereabove connected to the safety pressure valve and wherein the stopper is mounted on said diaphragm or bellows and to the interior of the bottle, the upwardly projected area of the diaphragm or bellows forming a wall of said space being greater than the downwardly projected area of the stopper, whereby the diaphragm or bellows is forced by gas pressure within the bottle acting on the differential areas to urge the stopper into the neck of the bottle.

10. An appliance as claimed in claim 1, wherein the casing is molded in one piece as a generally channel-shaped molding, with the web of the channel at the rear and the open side of the front, the pivotal assembly being pivoted thereto adjacent the top of the two side members of the channel.

* * * * *